(12) United States Patent
Skagestad et al.

(10) Patent No.: US 7,785,660 B2
(45) Date of Patent: Aug. 31, 2010

(54) PREPARATION OF POLYMER PARTICLES

(75) Inventors: Vidar Skagestad, Haslum (NO); Lars Kilaas, Trondheim (NO)

(73) Assignee: QIAGEN GmbH, Hilden (DE)

( * ) Notice: Subject to any disclaimer, the term of this patent is extended or adjusted under 35 U.S.C. 154(b) by 1132 days.

(21) Appl. No.: 10/482,822

(22) PCT Filed: Jul. 4, 2002

(86) PCT No.: PCT/IB02/02623

§ 371 (c)(1),
(2), (4) Date: Jul. 15, 2004

(87) PCT Pub. No.: WO03/004151

PCT Pub. Date: Jan. 16, 2003

(65) Prior Publication Data

US 2005/0003181 A1 Jan. 6, 2005

(30) Foreign Application Priority Data

Jul. 4, 2001 (GB) .................................. 0116358.3

(51) Int. Cl.
*B05D 5/00* (2006.01)
(52) U.S. Cl. ...................... 427/212; 427/129; 427/130; 427/343; 264/13; 435/176; 435/181
(58) Field of Classification Search ................. 427/212, 427/129, 130; 264/13; 436/531; 435/176, 435/181
See application file for complete search history.

(56) References Cited

U.S. PATENT DOCUMENTS

| 4,873,102 | A | | 10/1989 | Chang et al. ................. 427/130 |
| 4,940,350 | A | * | 7/1990 | Kim ........................... 401/209 |
| 5,206,159 | A | * | 4/1993 | Cohen et al. ................ 435/180 |
| 5,648,124 | A | * | 7/1997 | Sutor ......................... 427/475 |
| 5,720,939 | A | | 2/1998 | Schröder .................... 429/322 |
| 6,204,033 | B1 | * | 3/2001 | Muller-Schulte ............ 435/181 |
| 6,620,214 | B2 | * | 9/2003 | McArdle et al. .............. 51/298 |

FOREIGN PATENT DOCUMENTS

| WO | WO 83/03920 A1 | 11/1983 |
| WO | WO 94/11103 A1 | 5/1994 |
| WO | WO 97/22366 A1 | 6/1997 |

* cited by examiner

*Primary Examiner*—Nadine G Norton
*Assistant Examiner*—Maki A Angadi
(74) *Attorney, Agent, or Firm*—Thomas A. Haag; Fanelli Strain & Haag PLLC

(57) ABSTRACT

A process for the preparation of polymer magnetic particles, which comprises: providing polymer particles having a porous interior, and contacting the polymer particles with a magnetic fluid comprising a homogeneous dispersion of magnetic particles, whereby the magnetic particles are incorporated into the porous interior to produce polymer magnetic particles.

23 Claims, No Drawings

PREPARATION OF POLYMER PARTICLES

CROSS REFERENCE TO RELATED APPLICATIONS

This application is a U.S. national filing under 35 U.S.C. §371 of international (PCT) application No. PCT/IB02/02623, filed Jul. 4, 2002, designating the U.S., and claiming Priority to Great Britain Application No. 0116358.3, filed Jul. 4, 2001.

The invention relates to a process for the preparation of polymer magnetic particles and particles obtainable therefrom, particularly for use as separation media, especially for separating a target substance from a sample such as a biological sample.

BACKGROUND TO THE INVENTION

Various types of separation media are available for use in isolating target substances in chemical or biological samples. In molecular biology, various materials are used in fractionation procedures, including agarose and polyacrylamide in electrophoretic fractionation, and gel permeation, ion exchange and affinity materials for chromatography. Among such materials, both organic polymer and silicon-based particles find use in separations of targets such as nucleic acids. In each type of separation there is a need at some point physically to remove a liquid phase from the particles in the solid phase. This may be achieved by immobilising the particles, for example in the form of a column or on a gel plate, and eluting the liquid phase or by aggregating the particles by applying a force under centrifugation or using magnetism. The use of magnetism to separate particles from other sample components requires the particles to respond to a magnetic field. Because organic or silicon-based materials are not themselves magnetically responsive, there is a need to devise methods of production of magnetic particles which incorporate both a magnetic component and a polymer component.

WO83/03920 describes preparation of polymer magnetic particles in which iron is introduced into porous polymer particles in solution. Non-magnetic iron salts are mixed with the porous particles and the iron is subsequently precipitated in the pores as magnetite deposits. In order to achieve this, there is a requirement that an additional step comprising an oxidation reaction be carried out in situ to convert the non-magnetic iron into magnetite.

More recently, U.S. Pat. No. 5,648,124 describes a process for preparing magnetically responsive micro particles which are presently available commercially from Seradyn Inc. According to this process, a non-porous core particle is provided onto which is deposited magnetite from a ferrofluid in the presence of a heterocoagulant. A coating of magnetite is deposited on the surface of the core. In order to achieve a sufficiently high concentration of magnetite, there is a need in this process to use the heterocoagulant, which acts as a binding agent to enable further magnetite to be deposited on the coated core. The particles obtained by this process have a further disadvantage that the magnetic component therein is not uniformly distributed.

The present invention aims to overcome the drawbacks of the prior art by providing a simplified process for the production of useful polymer magnetic particles.

SUMMARY OF THE INVENTION

Accordingly, in a first aspect, the present invention provides a process for the preparation of polymer magnetic particles, which comprises:

(a) providing polymer particles having a porous interior; and
(b) contacting the polymer particles with a magnetic fluid comprising a homogeneous dispersion of magnetic particles, whereby the magnetic particles are incorporated into the porous interior to produce polymer magnetic particles.

It has surprisingly been found that magnetic particles can be incorporated into the porous interior of polymer particles in a stable manner without the need for additional chemical reactions and produce polymer magnetic particles containing sufficiently high concentrations of magnetic particles for use in separating the target substance from a sample.

Advantageously, the polymer particles are contacted with the magnetic fluid at sub-atmospheric pressure. Use of the reduced pressure is found to promote entry of the magnetic fluid into the porous interior of the polymer particles.

It is preferred that the polymer particles are dry when contacted with the magnetic fluid particularly so that the magnetic fluid enters the porous interior by capillary action and may do so in a relatively short time. Entry of the magnetic fluid into the porous interior by capillary action is promoted where the porous interior of the polymer particles is wettable by the liquid phase in which the particles are suspended. When the polymer particles are wet table in this way, they are dispersible in an aqueous medium. This may be achieved if the porous interior of the polymer particles bears hydrophilic groups. Hydrophilic groups may be borne by polymer particles containing both hydrocarbon and heteroatomic structures. Among those hydrophilic groups useful according to the present invention may be included esters, amines, alcohols, carboxylic acid, amides, halides, aldehydes, keto componds, imines, nitro componds, thiols, thioethers, nitriles, acid anhydrides and sulfonic compounds. It is preferred that the polymer particles have a porous interior of which more than 60% bears hydrophilic groups which may be charged or uncharged.

In one embodiment, it is preferred that the porous interior of the polymer particles bears charge groups and the magnetic particles bear a charge opposite to that of the charge groups in the porous interior. Charged hydrophilic groups are particularly useful.

The magnetic particles bear a charge opposite to that of the charge borne by the porous interior so that ionic interactions between the two charges enable the magnetic particles to be incorporated in a stable manner. In one aspect, the magnetic particles are positively charged and this is conveniently achieved by preparing the magnetic fluid to have an acidic pH, generally in the range 1 to 6, preferably in the range 1 to 3. According to this aspect, the charged groups of the porous interior are negatively charged. Among negatively charged functional groups may be mentioned sulphonates, phosphonates, carboxylates, nitrates, and inorganic bound species of carbonates and chlorates. In a further aspect, the magnetic particles are negatively charged and this is conveniently achieved by preparing the magnetic fluid to have a basic pH, generally in the range 8 to 14. According to this aspect, the charged groups of the porous interior are positively charged. Among positively charged groups or chemical groups with the potential to be so, may be mentioned imines, ammonia, ammonium, phosphonium and sulphonium.

The groups of the porous interior may comprise any suitable functional groups which are readily incorporated into the polymer structure by derivatisation or as monomers or co monomers or via the adsorption of monomers, co monomers or polymers consisting of these and other chemical groups into a pre-formulated porous interior.

The magnetic fluid of the invention comprises a homogeneous dispersion of magnetic particles which are not in solution and are therefore not required to be subjected to further chemical reaction to render them magnetic or to retain them in the porous interior of the polymer particles. The magnetic particles are magnetic in the sense that they are capable of being magnetised in the presence of a magnetic field but are not themselves magnetic in the absence of such a field at the operational temperature of the polymer magnetic particles. Such magnetic materials include paramagnetic and superparamagnetic materials. They also include ferromagnetic and ferrimagnetic materials, provided that they have a sufficiently low Curie temperature that, in operation, the polymer magnetic particles are not magnetic in the absence of an applied magnetic field. Typical materials include magnetic metal oxides especially the iron oxides. Useful magnetic metal oxides include iron oxides in which, optionally, all or a part of the ferrous iron thereof is substituted by a divalent transition metal such as cadmium, chromium, cobalt, copper, magnesium, manganese, nickel, vanadium, and/or zinc.

It is preferred that the magnetic fluid is provided as a ferrofluid. The magnetic fluids useful in the present invention particularly include those which have magnetic particles of maximum dimension typically up to about 50 nm, advantageously up to about 25 nm and preferably in the range of 1 to less than 10 nm. Particles of this size are able to be dispersed in any of the small pores of the polymer particles. This leads to a very high iron loading capacity for the particles and a uniform distribution of magnetic particles throughout the polymer particles.

The polymer particles may be organic polymer particles or inorganic polymer particles. Typically, the polymer particles have a pore volume in the range 30 to 90%, preferably in the range 30 to 75%. The polymer particles may be prepared by known methods, including those described in WO83/03920. This includes the use of vinyl monomers and polyvinyl monomers and mixtures thereof. Vinyl monomers include styrene, styrene derivatives, maleic anhydride, acrylates, methacrylates and vinyl esters.

Where high ligand binding to the polymer particles is required, particles must be produced with a high specific surface area. This can be achieved using prior art methodology only if a relatively small particle size is used. A disadvantage in use of such small particles is that they separate only very slowly in an applied magnetic field. If larger particles are used instead, a much bigger pore size is required. This is not readily achievable with prior art methodology because the deposition of magnetite crystals in large pores gives rise to residual magnetisation or remanence in use. In contrast, the present invention provides a controllable method capable of application to both large and small polymer particles. It is possible to make particles with controlled pore size distribution. Relatively small pores mainly in the range 1 to 20 nm, preferably in the range 1 to 15 nm and especially in the range 1 to 10 nm can be made in addition to or alternatively to relatively large pores of radius 100 to 500 nm. Using a magnetic fluid according to the present invention, magnetic particles would tend to enter the small pores by capillary action in preference to the large pores. In this way there is no problem with remanence and relatively large polymer particles can contain high concentrations of magnetic particles evenly distributed throughout whilst leaving the large pores for ligand binding.

The polymer magnetic particles obtainable by the present process in which the magnetic component is substantially uniformly distributed are thought to be superior to those polymer magnetic particles presently available. Using light microscopy it is found that magnetic polymer particles currently available incorporate magnetite or other metal oxides only in an aggregated non-homogenous form as visible metal cores coated with layers of silica. In contrast, the present invention provides a magnetic component which is homogeneously and uniformly distributed throughout the particle matrix. This has an important advantage over the prior art magnetic particles in providing a uniform and potentially rapid response to a magnetic field when in use. This makes possible aggregation of the particles at a uniform speed onto the surface by application of a magnetic field; this is an essential property when using such particles, for example, in an automated separation system.

DETAILED DESCRIPTION OF THE INVENTION

The invention will now be described in further detail, by way of example only, with reference to the following examples.

EXAMPLE 1

2 μm Sulfonated polystyrene particles (4.5 g, 74% porosity) were placed in a rotavapor. The particles were carefully rotated and the system evacuated for air using a pump. After 10 min at a pressure of −10 mm Hg, an aqueous ferrofluid (30 g, 57 mg magnetite/g, pH 1.2) were added. The suspension was rotated for 15 min., distilled water (20 ml) added and rotation continued for 10 min at atmospheric pressure. The polymer magnetic particles were washed with water (5×50 ml) by separating the particles on a magnetic device. The polymer magnetic particles may then be post treated in a suspension or in a dry state.

EXAMPLE 2

2 μm sulfonated polystyrene particles (4.5 g, 74% porosity) were treated with 5 ml of a 10% Polyethyleneimine (MW 1000) in 0.05 M Na-phosphate pH 8.5 for 1 day at ambient temperature. The particles were collected by centrifugation (rpm=1000) and washed 3 times (20 ml) with 0.1 M Na-phosphate pH. 7.3 and 3 times 20 ml methanol. A positive surface charge (>+30 mv) was confirmed in the pH range 4-9 by zeta potential measurements. The particles were added to an aqueous alkali ferrofluid (pH ca 11, 3 g, 29 magnetite/g). The suspension was rotated 1 d at ambient temperature. The polymer magnetic particles were collected by a magnetic device and washed with water (3×50 ml) and 0.1 M Na-phosphate pH 7.3 (0.3×50 ml).

Examples 3-9 and 16-18 include dried porous polymer particles before adding ferro fluid

EXAMPLE 3

Reduced Pressure

Sulphonated porous polystyrene particles (1.0 g) with a diameter of about 3 μm were placed in a round bottomed flask (50 ml). The flask was then mounted on a Büchi Rotavapor. Under gentle rotation of the flask the pressure was reduced to 10 mbar. After a period of 30 minutes, 8.4 ml ferro fluid was carefully introduced under reduced pressure. The process was continued at room temperature (1 hour) until all the liquid was evaporated off and subsequently heated at 65° C. for 1 hour. The dry particles were then redispersed in methanol (20 ml) by ultrasonic treatment (3 min) and finally isolated by centrifugation.

The particles were then dispersed in acetone (20 ml) and separated by centrifugation. This washing procedure was repeated three times and the particles were dried over night at 50° C. Polymer particles with a relative magnetic susceptibility of $13.77 \cdot 10^{-3}$ cgse were then obtained.

EXAMPLE 4

Atmospheric Pressure

Sulphonated porous polystyrene particles (0.26 g) with a diameter of about 3 μm were placed in a round bottomed flask (50 ml). 2 ml ferro fluid was then added. The flask was then mounted on a Büchi Rotavapor and gently rotated for 30 minutes at atmospheric pressure before methanol (20 ml) was added. After an ultrasonic treatment of 3 minutes the particles were isolated by centrifugation. The particles were then dispersed in acetone (20 ml) and separated by centrifugation. This washing procedure was repeated four times and the particles were then dried over night at 50° C. Polymer particles with a relative magnetic susceptibility of $9.75 \cdot 10^{-3}$ cgse were then obtained.

EXAMPLE 5

Non Sulphonated Particles, Reduced Pressure

Porous polystyrene particles (1.0 g) with a diameter of about 3 μm were placed in a round bottomed flask (50 ml). The flask was then mounted on a Büchi Rotavapor. Under gentle rotation of the flask the pressure was reduced to 10 mbar. After a period of 30 minutes 10 ml ferrofluid was carefully introduced under reduced pressure and subsequently the temperature was increased to 65° C. and maintained at this temperature for 1 hour and dry particles were obtained. The dry particles were then redispersed in methanol (20 ml) by ultrasonic treatment (3 min) and finally isolated by centrifugation. The particles were then dispersed in acetone (20 ml) and separated by centrifugation. This washing procedure was repeated three times and the particles were dried at 50° C. for 5 hours. Polymer particles with a relative magnetic susceptibility of $13.98 \cdot 10^{-3}$ cgse were then obtained.

EXAMPLE 6

Non Sulphonated Particles, PDAK, Reduced Pressure

Porous polystyrene particles (1.0 g) with a diameter of about 3 μm were dispersed in a mixture of 5% aqueous solution of poly (diallyldimethyl ammonium chloride) (10 ml) and methanol (10 ml) and left over night. The particles were then isolated by centrifugation and redispersed in water (20 ml). This washing with water was repeated three times. One half of the sample was then washed three times with methanol (20 ml) similar to the previous water wash and dried from methanol. The dried particles (approximate 0.5 g) were placed in a round-bottomed flask (50 ml). The flask was then mounted on a Büchi Rotavapor. Under gentle rotation of the flask the pressure was reduced to 10 mbar. After a period of 30 minutes 4.2 ml ferro fluid was carefully introduced under reduced pressure and subsequently the temperature was increased to 65° C. and maintained at this temperature for 1 hour and dry particles were obtained. The dry particles were then redispersed in methanol (20 ml) by ultrasonic treatment (3 min) and finally isolated using a permanent magnet. The particles were then again dispersed in methanol (20 ml) and separated with a magnet. This washing procedure was repeated three times. The particles were then washed three times in acetone (20 ml) similar to the methanol wash and dried over night at 50° C. Polymer particles with a relative magnetic susceptibility of $24.40 \cdot 10^{-3}$ cgse were then obtained.

EXAMPLE 7

Non Sulphonated Particles, PDAK, Atmospheric Pressure

The other half of the aqueous dispersion of particles treated with poly(diallyldimethyl ammonium chloride) in example 6 was treated by centrifugation to isolate the particles. The isolated wet particles (approximate 0.5 g) were transformed to a round bottomed flask (50 ml) and 4.2 ml of ferro fluid was added. After gentle rotation of the flask for 2 hours on a Büchi Rotavapor at atmospheric pressure, the sample was allowed to stand over night. The particles were then isolated using a permanent magnet and redispersed in methanol (20 ml) by ultrasonic treatment (3 minutes). The particles were then washed three times with acetone (20 ml) using the same procedure as described in example 6. After drying (50° C. over night) polymer particles with a relative magnetic susceptibility of $8.41 \cdot 10^{-3}$ cgse were then obtained.

EXAMPLE 8

Sulphonated Particles, PDAK, Reduced Pressure

By replacing the porous polystyrene particles with the corresponding sulphonated particles in the procedure for preparation of magnetic polymer particles described in example 6, polymer particles with a relative magnetic susceptibility of 15.36-10-3 were obtained.

EXAMPLE 9

Sulphonated Particles, PDAK, Atmospheric Pressure

By replacing the porous polystyrene particles with the corresponding sulphonated particles in the procedure for preparation of magnetic polymer particles described in example 7, polymer particles with a relative magnetic susceptibility of $9.58 \cdot 10^{-3}$ were obtained.

Examples 10-15 include non dried porous polymer particles before adding the ferro fluid

EXAMPLE 10

Non Sulphonated Particles, Atmospheric Pressure

Dried porous polystyrene particles (1.0 g) with a diameter of about 3 μm were dispersed in methanol (20 ml). The particles were separated by centrifugation and transformed without drying to a round bottomed flask (50 ml) and 10 ml ferro fluid was added. After gentle rotation of the flask for 1 hour on a Büchi Rotavapor at atmospheric pressure the particles were isolated by centrifugation. The particles were then dispersed in water (20 ml) and separated by centrifugation. This washing procedure with water was repeated three times. Subsequently the particles were washed two times with methanol (20 ml) and dried over night at 50° C. Polymer particles with a relative magnetic susceptibility of $4.02 \cdot 10^{-3}$ cgse were then obtained.

EXAMPLE 11

Non Sulphonated Particles, Reduced Pressure

Dried porous polystyrene particles (1.0 g) with a diameter of about 3 μm were dispersed in methanol (20 ml). The particles were separated by centrifugation and transformed without drying to a round bottomed flask (50 ml) and a 10 ml ferro fluid was added. The flask was mounted on a Büchi Rotavapor and the pressure carefully reduced to 20 mbar. After 20 minutes at reduced pressure the particles were isolated by centrifugation. The particles were then dispersed in water (20 ml) and separated by centrifugation. This washing procedure with water was repeated three times. Subsequently the particles were washed two times with methanol (20 ml) and dried over night at 50° C. Polymer particles with a relative magnetic susceptibility of $2.42 \cdot 10^{-3}$ cgse were then obtained.

EXAMPLE 12

Dry Sulphonated Particles, Reduced Pressure

Dried sulphonated porous polystyrene particles (1.0 g) with a diameter of about 3 μm were transformed to a round bottomed flask (50 ml) and 10 ml ferro fluid was added. The sample was treated in an ultrasonic bath for one minute and subsequently the flask was mounted on a Büchi Rotavapor and the pressure carefully reduced to 75 mbar. After 20 minutes at reduced pressure the particles were isolated by centrifugation. The particles were then dispersed in water (20 ml) and separated by centrifugation. This washing procedure with water was repeated four times. Subsequently the particles were washed two times with methanol (20 ml) and dried over night at 50° C. Polymer particles with a relative magnetic susceptibility of $1.09 \cdot 10^{-3}$ cgse were then obtained.

EXAMPLE 13

Dry Sulphonated Particles, Atmospheric Pressure

Dried sulphonated porous polystyrene particles (1.0 g) with a diameter of about 3 μm were transformed to a round bottomed flask (50 ml) and 10 ml of ferro fluid was added. The sample was treated in an ultrasonic bath for one minute and subsequently the flask was mounted on a Büchi Rotavapor. After gentle rotation of the flask for 20 minutes at atmospheric pressure the particles were isolated by centrifugation. The particles were then dispersed in water (20 ml) and separated by centrifugation. This washing procedure with water was repeated two times. Subsequently the particles were washed two times with methanol (20 ml) and dried over night at 50° C. Polymer particles with a relative magnetic susceptibility of $1.10 \cdot 10^{-3}$ cgse were then obtained.

EXAMPLE 14

Water Dispersed Sulphonated Particles, Reduced Pressure

Sulphonated porous polystyrene particles (1.0 g) with a diameter of about 3 μm were dispersed in water (20 ml). The particles were separated by centrifugation and transformed without drying to a round bottomed flask (50 ml) and 10 ml ferro fluid was added. The sample was treated in an ultrasonic bath for one minute before the flask was mounted on a Büchi Rotavapor and the pressure carefully reduced to 20 mbar. After 20 minutes at reduced pressure the particles were isolated by centrifugation. The particles were then dispersed in water (20 ml) and separated by centrifugation. This washing procedure with water was repeated two times. Subsequently the particles were washed two times with methanol (20 ml) and dried over night at 50° C. Polymer particles with a relative magnetic susceptibility of $3.11 \cdot 10^{-3}$ cgse were then obtained.

EXAMPLE 15

Water Dispersed Sulphonated Particles, Atmospheric Pressure

Sulphonated porous polystyrene particles (1.0 g) with a diameter of about 3 μm were dispersed in water (20 ml). The particles were separated by centrifugation and transformed without drying to a round bottomed flask (50 ml) and 10 ml ferro fluid was added. The sample was treated in an ultrasonic bath for one minute. After gentle rotation of the flask for 1 hour on a Büchi Rotavapor at atmospheric pressure, the particles were isolated by centrifugation. The particles were then dispersed in water (20 ml) and separated by centrifugation. This washing procedure with water was repeated two times. Subsequently the particles were washed two times with methanol (20 ml) and dried over night at 50° C. Polymer particles with a relative magnetic susceptibility of $3.13 \cdot 10^{-3}$ cgse were then obtained.

EXAMPLE 16

Sulphonated Particles

Dried sulphonated porous polystyrene particles (10.0 g) with a diameter of about 3 μm were placed in a round bottomed flask (250 ml). The flask was then mounted on a Büchi Rotavapor. Under gentle rotation of the flask the pressure was reduced to 10 mbar. After 15 minutes the pressure was raised to 200 mbar and 10 ml Ferro fluid was carefully introduced. Subsequently the pressure was reduced carefully to 20 mbar and kept at this level for 30 minutes. The particles were then separated by centrifugation and redispersed in a mixture of methanol (100 ml) and water (100 ml) and separated by centrifugation. Subsequently the isolated particles were dispersed in methanol (200 ml), separated by centrifugation and finally dried over night at 50° C. Polymer particles with a relative magnetic susceptibility of $7.03 \cdot 10^{-3}$ cgse were then obtained.

EXAMPLE 17

Sulphonated Particles, Pei

Sulphonated porous polystyrene particles (1.0 g) with a diameter of about 3 μm were dispersed in a 5% aqueous solution of polyethylenimine (10 ml) by ultrasonic treatment (2 minutes). After 40 minutes at room temperature the particles were isolated by centrifugation and redispersed in water (20 ml). Subsequently the particles were separated by centrifugation and redispersed in methanol (20 ml). Finally the particles were isolated (centrifugation) and dried over night at 50° C. The dried particles were placed in a round-bottomed flask (50 ml). The flask was then mounted on a Büchi Rotavapor. Under gentle rotation of the flask the pressure was reduced to 10 mbar. After a period of 20 minutes, the pressure was adjusted to 200 mbar and 10 ml ferro fluid was carefully introduced. The pressure where gradually reduced to 20 mbar and maintained at this level for 20 minutes. The particles were then separated by centrifugation and redispersed in a 1:1

(volume) mixture of water and methanol (25 ml). This washing procedure was repeated two times and the particles were isolated (centrifugation) and dried over night at 50° C. Polymer particles with a relative magnetic susceptibility of $9.69 \cdot 10^{-3}$ cgse were then obtained.

EXAMPLE 18

Sulphonated Particles, PDAK

Sulphonated porous polystyrene particles (1.0 g) with a diameter of about 3 μm were dispersed in a 5% aqueous solution of poly(diallyldimethylammonium chloride) (10 ml) by ultrasonic treatment (2 minutes). After 40 minutes at room temperature the particles were isolated by centrifugation and redispersed in water (20 ml). Subsequently the particles were separated by centrifugation and redispersed in methanol (20 ml). Finally the particles were isolated (centrifugation) and dried over night at 50° C. The dried particles were placed in a round bottomed flask (50 ml). The flask was then mounted on a Büchi Rotavapor. Under gentle rotation of the flask the pressure was reduced to 10 mbar. After a period of 20 minutes, the pressure was adjusted to 200 mbar and 10 ml ferro was carefully introduced. The pressure where gradually reduced to 20 mbar and maintained at this level for 20 minutes. The particles were then separated by centrifugation and redispersed in a 1:1 (volume) mixture of water and methanol (25 ml). This washing procedure was repeated two times and the particles were isolated (centrifugation) and dried over night at 50° C. Polymer particles with a relative magnetic susceptibility of $8.29 \cdot 10^{-3}$ cgse were then obtained.

The invention claimed is:

1. A process for the preparation of polymer magnetic particles, which comprises:
    (a) providing non-magnetic polymer particles having a porous interior; and
    (b) contacting the non-magnetic polymer particles of step (a) with a magnetic fluid wherein the magnetic fluid is a homogeneous dispersion of magnetic particles, whereby the magnetic particles are incorporated into the porous interior to produce polymer magnetic particles, and no additional step comprising an oxidation reaction is applied to the magnetic fluid.

2. A process according to claim 1, wherein the polymer particles are dry when contacted with the magnetic fluid.

3. A process according to claim 2, wherein the magnetic fluid enters the porous interior by capillary action.

4. A process according to claim 1, wherein the polymer particles are contacted with the magnetic fluid at sub-atmospheric pressure.

5. A process according to claim 1, wherein the polymer particles are dispersible in an aqueous medium.

6. A process according to claim 5, wherein the porous interior of the polymer particles bears hydrophilic groups.

7. A process according to claim 6, wherein the hydrophilic groups are selected from one or more of esters, amines, alcohols, carboxylic acid, amides, halides, aldehydes, keto compounds, imines, nitro compounds, thiols, thioethers, nitrites, acid anhydrides and sulfonic compounds.

8. A process according to claim 1, wherein the porous interior of the polymer particles bears charged groups and the magnetic particles bear a charge opposite to that of the charged groups of the porous interior.

9. A process according to claim 8, wherein the magnetic particles are positively charged.

10. A process according to claim 9, wherein the charged groups of the porous interior comprise sulphonate groups, phosphonate groups, carboxylate groups, nitrate groups, or inorganic bound species of carbonates or chlorates.

11. process according to claim 8, wherein the magnetic particles are negatively charged.

12. A process according to claim 11, wherein the charged groups of the porous interior comprise imine groups, ammonia groups, ammonium groups, phosphonium groups, or sulphonium groups.

13. A process according to claim 1, wherein the magnetic fluid is a ferrofluid.

14. A process according to claim 1, wherein the magnetic particles have a maximum dimension in the range of 1 to 50 nm.

15. A process according to claim 14, wherein the maximum dimension is less than 10 nm.

16. A process according to claim 1, wherein the polymer particles have a pore volume in the range 30 to 90%.

17. A process according to claim 16, wherein the pore volume is no greater than 75%.

18. A process according to claim 1, wherein the porous interior of the polymer particles comprises small pores with a radius in the range 1 to 10 nm.

19. A process according to claim 1, wherein the porous interior of the polymer particles comprises large pores with a radius in the range 100 to 500 nm.

20. Polymer magnetic particles obtained by the process according to claim 1, in which the magnetic particles are substantially uniformly distributed.

21. A method of separating a target substance from a sample using the polymer magnetic particles according to claim 20.

22. A process according to claim 1, wherein said non-magnetic polymer particles are dried prior to step (b).

23. A process according to claim 1, wherein said non-magnetic polymer particles are formed prior to step (b).

* * * * *